(12) United States Patent
Adachi et al.

(10) Patent No.: US 9,166,674 B2
(45) Date of Patent: Oct. 20, 2015

(54) SATELLITE COMMUNICATION DEVICE, AND REMOTE CONTROL METHOD

(71) Applicant: FURUNO Electric Company Limited, Nishinomiya, Hyogo (JP)

(72) Inventors: Satoshi Adachi, Nishinomiya (JP); Katsuhiro Takahashi, Nishinomiya (JP); Kazumasa Yamamoto, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 198 days.

(21) Appl. No.: 13/954,426

(22) Filed: Jul. 30, 2013

(65) Prior Publication Data
US 2014/0036761 A1 Feb. 6, 2014

(30) Foreign Application Priority Data
Jul. 31, 2012 (JP) .................................. 2012-170077

(51) Int. Cl.
*H04B 7/185* (2006.01)
(52) U.S. Cl.
CPC ............ *H04B 7/18539* (2013.01); *H04B 7/185* (2013.01)

(58) Field of Classification Search
None
See application file for complete search history.

(56) References Cited

U.S. PATENT DOCUMENTS

| | | | |
|---|---|---|---|
| 7,664,815 B2 * | 2/2010 | Gundersen et al. | ............ 709/204 |
| 8,868,028 B1 * | 10/2014 | Kaltsukis | ................... 455/404.2 |
| 2008/0246627 A1 * | 10/2008 | Guazzelli | ................. 340/870.02 |
| 2009/0083804 A1 * | 3/2009 | Gat et al. | ......................... 725/62 |
| 2009/0219927 A1 * | 9/2009 | Hartog | ................ H04M 1/2471 370/355 |
| 2012/0196571 A1 * | 8/2012 | Grkov et al. | ................... 455/411 |
| 2014/0036761 A1 * | 2/2014 | Adachi et al. | ................. 370/315 |

* cited by examiner

*Primary Examiner* — Benjamin H Elliott, IV
(74) *Attorney, Agent, or Firm* — Global IP Counselors, LLP

(57) ABSTRACT

An object of the present invention is to provide a satellite communication device which receives instructions from a remote place and automatically carries out a predetermined process. The satellite communication device includes an acquiring section, a storing section, and a control section. The acquiring section acquires instruction information through an artificial satellite by line switching type communication. The storing section stores the instruction information and a registered process by established correspondence. The control section reads out a process corresponding to the instruction information acquired by the acquiring section based on storage contents of the storing section, and carries out the process that has been read out.

16 Claims, 3 Drawing Sheets

| Extension Number | Process conducted by control section |
|---|---|
| 11 | Start of remote connection |
| 12 | Transmission of call/ communication log |
| 13 | Transmission of operation status of instrument |
| 21 | Stop of predetermined communication |
| 22 | Restart |
| ... | ... |

FIG. 2 (a)

| First extension number | Second extension number | Process conducted by control section |
|---|---|---|
| 1 | 1 | Start of remote connection A |
| | 2 | Start of remote connection B |
| | 3 | Start of remote connection C |
| 2 | 1 | Transmission of call/ communication log to A |
| | 2 | Transmission of operation status of instrument to A |
| 3 | | Restart |
| ... | ... | ... |

FIG. 2(b)

SATELLITE COMMUNICATION DEVICE, AND REMOTE CONTROL METHOD

CROSS-REFERENCE TO RELATED APPLICATIONS

This application claims priority to Japanese Patent Application No. 2012-170077 filed on Jul. 31, 2012. The entire disclosure of Japanese Patent Application No. 2012-170077 is hereby incorporated herein by reference.

BACKGROUND

1. Field of the Invention

The present invention mainly relates to a satellite communication device for performing communication through an artificial satellite.

2. Background Information

Conventionally, a technology for performing communication such as a telephone, a facsimile, the Internet, or the like through an artificial satellite has been known. Communication through an artificial satellite (hereinafter, referred to as satellite communication) is utilized in a region which does not have wired or wireless communication equipment (at sea or on an isolated island), for example. U.S. Pat. No. 7,664,815 (Patent Document 1) discloses this kind of technology.

According to Patent Document 1, a crew member of a marine vessel can receive support for a marine instrument from a person in a remote place using satellite communication by selecting the marine instrument in accordance with instructions of the system.

SUMMARY

In many cases, the usage fee of the Internet through satellite communication is charged at a metered rate based on the communication amount, the communication time, or the like. Therefore, a user of satellite communication usually conducts a connection process for conducting an operation using the Internet, and conducts a disconnection process when finishing the operation.

Therefore, when mail is sent from a remote place to a user of satellite communication, this mail will not necessarily be checked by the user of satellite communication at once. Also, even in a case of attempting a remote connection to the user of satellite communication, the remote connection cannot be established if the instrument of the user is not connected to the Internet.

Accordingly, in such a case, it is necessary to contact the user of satellite communication using a telephone, for example, and ask the user to conduct a required operation (a process of connecting to the Internet, settings of allowing a remote connection, or the like). However, this process causes a burden to the user of satellite communication, and causes a problem that the above-described process cannot be carried out in a case where the user of satellite communication cannot answer the telephone.

Further, even in a case of the environment which is connected to the Internet all the time, there is a possibility that instructions through the Internet will be delayed. Therefore, telephone communication is needed for emergency instructions or the like.

The present invention was made to address the above-described circumstances, and an object of the present invention is to provide a satellite communication device which receives instructions from a remote place (without delay) and automatically carries out a predetermined process.

The problems to be solved by the present invention are as described above, and the means used to solve the problems and the effects will be explained next.

According to a first aspect of the present invention, there is provided a satellite communication device of the following configuration. Specifically, the satellite communication device includes an acquiring section, a storing section, and a control section. The acquiring section is configured to acquire instruction information through an artificial satellite by one of line switching type communication and VoIP communication. The storing section is configured to store the instruction information and a registered process by established correspondence. The control section is configured to read out a process corresponding to the instruction information acquired by the acquiring section based on storage contents of the storing section. The control section is further configured to carry out the process that has been read out.

With this configuration, since the satellite communication device automatically carries out a process (without any user intervention), it is possible to save the user's trouble. Also, even in a case where the satellite communication device is not connected to the Internet, it is possible to cause the satellite communication device to conduct a desired process from a remote place by performing line switching type communication.

In the above-described satellite communication device, preferably, the instruction information is acquired by telephone, and the acquiring section is configured to automatically answer the telephone and acquire the instruction information.

With this configuration, it is possible to confirm that an instruction has been received by using the telephone.

Preferably, the above-described satellite communication device has the following configuration. Specifically, the satellite communication device can switch between activating and deactivating automatic answering to a telephone call. In a case where there is an incoming call from a registered number, the acquiring section is configured to automatically answer the incoming call even if the automatic answering is deactivated.

With this configuration, the source of an incoming call for issuing an instruction to the control section is registered in advance, and only in a case where there is an incoming call from the registered source, the instruction to the control section are received. In a case where there is an incoming call from another source, an alarm or the like can be set to go off so as to talk on the telephone. Another configuration is also possible in which an instruction from a reliable source are awaited all the time, and instructions from another source are blocked.

In the above-described satellite communication device, preferably, the acquiring section is configured to acquire the instruction information through the artificial satellite by the line switching type communication.

With this configuration, it is possible to reduce the possibility that will be delayed in the case of using line switching type communication compared to a configuration in which an instruction is issued by packet switching type communication (the Internet).

In the above-described satellite communication device, preferably, the process registered in the storing section includes a process of starting packet switching type communication.

With this configuration, it is possible to conduct a remote connection from a remote place or transmit and receive predetermined data by starting packet switching type communication with the satellite communication device.

In the above-described satellite communication device, preferably, the process registered in the storing section includes a process of transmitting log information which includes at least one of call history, communication history, process execution history, and operation status of an instrument.

With this configuration, it is possible to know an operation conducted by the satellite communication device, operation status of an instrument connected to the same network, or the like, from outside. Further, communication fee can be calculated based on the talk time, the communication amount (communication time), or the like of the satellite communication device.

In the above-described satellite communication device, preferably, the storing section is configured to store a plurality of pieces of the instruction information and a plurality of processes by established correspondence.

With this configuration, it is possible to cause the satellite communication device to conduct an appropriate process according to the status from a remote place.

In the above-described satellite communication device, preferably, a process conducted in response to the instruction information can be edited.

With this configuration, it is possible to flexibly respond to utilization form or the like of a user.

In the above-described satellite communication device, preferably, the control section is configured to give notice of at least one of a fact that an instruction has been received and a fact that a process based on the instruction has been finished to the sender of the instruction information.

In the present invention, since the instruction is issued using the line switching method, a person who has issued the instruction can accurately know transmission status of the instruction. With this configuration, a person who has issued the instruction can also know whether a process in response to the instruction can be actually carried out or not (or has been carried out or not) as well as transmission status of the instruction.

Preferably, the above-described satellite communication device is installed in a marine vessel.

With this configuration, the effects of the present invention can be exerted more effectively because satellite communication is frequently used in a marine vessel and there is a need to know the status of the marine vessel from outside.

According to a second aspect of the present invention, there is provided a remote control method for a satellite communication device as follows. Specifically, the remote control method for a satellite communication device includes an acquiring step and a processing step. In the acquiring step, instruction information is acquired through an artificial satellite by one of line switching type communication and VoIP communication. In the processing step, a process corresponding to the instruction information acquired in the acquiring step is carried out based on information in which the instruction information to be acquired from outside and a registered process have established correspondence.

With this configuration, since the satellite communication device automatically carries out a process (without any user intervention), it is possible to save the user's trouble. Also, even in a case where the satellite communication device is not connected to the Internet, it is possible to cause the satellite communication device to conduct a desired process from a remote place by performing line switching type communication.

According to a third aspect of the present invention, there is provided a remote control program of the following configuration. Specifically, the remote control program causes a computer to execute an acquiring process and a processing process. In the acquiring process, instruction information is acquired through an artificial satellite by one of line switching type communication and VoIP communication. In the processing process, a process corresponding to the instruction information acquired in the acquiring process is carried out based on information in which the instruction information to be acquired from outside and a registered process have established correspondence.

With this configuration, since the satellite communication device automatically carries out a process (without any user intervention), it is possible to save the user's trouble. Also, even in a case where the satellite communication device is not connected to the Internet, it is possible to cause the satellite communication device to conduct a desired process from a remote place by performing line switching type communication.

BRIEF DESCRIPTION OF THE DRAWINGS

Referring now to the attached drawings which form a part of this original disclosure:

FIG. 2 is a diagram explaining storage contents of a storing section; and

DETAILED DESCRIPTION OF EMBODIMENTS

Figure 1:
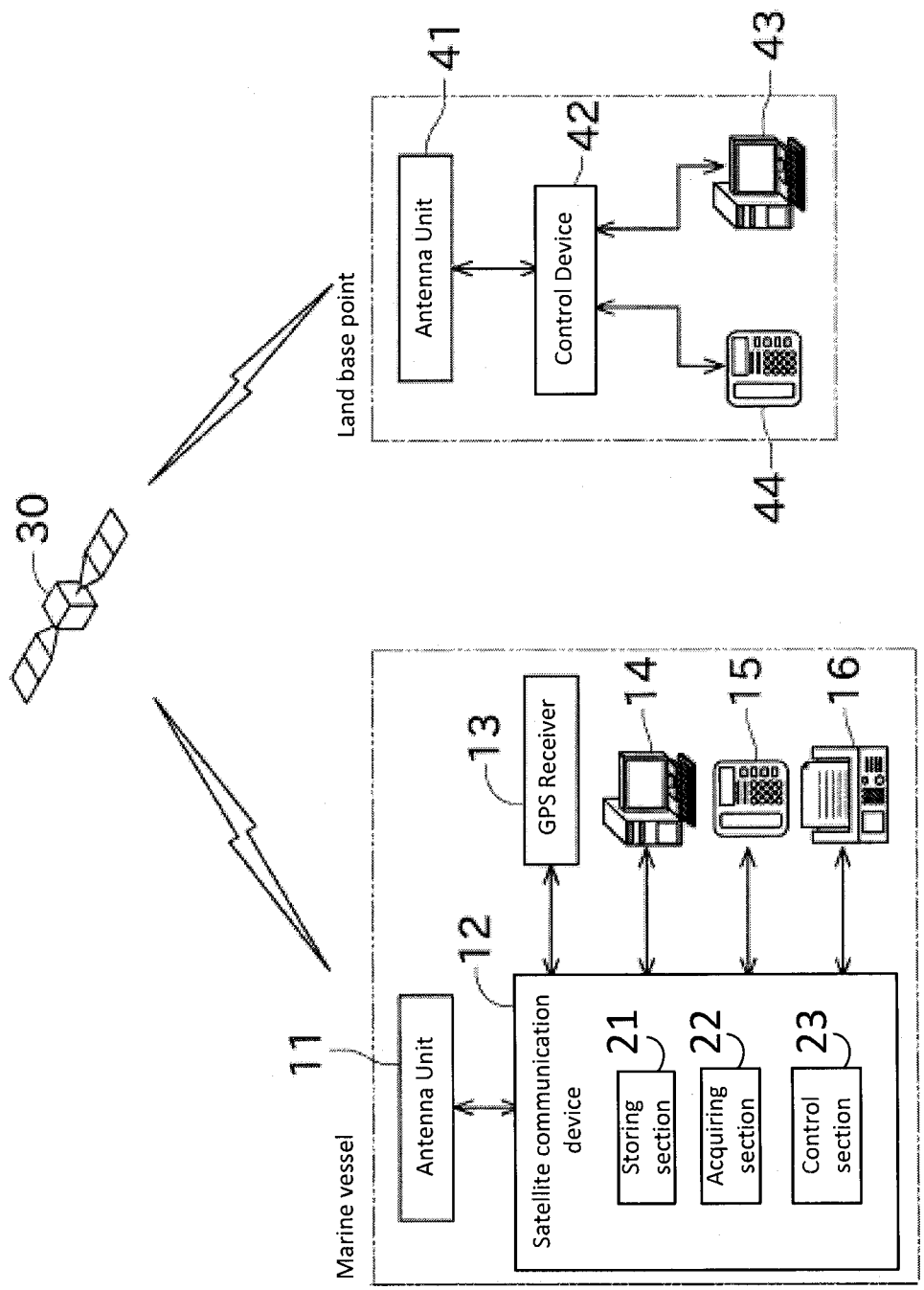
FIG. 1 is a block diagram showing a configuration in which satellite communication is performed between a marine vessel and a land base point.

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents. FIG. 1 is a block diagram showing a configuration in which satellite communication is performed between a marine vessel and a land base point. As shown in FIG. 1, communication through an artificial satellite 30 can be used in a case of performing satellite communication between a marine vessel and a land base point (a building or the like). Although only one artificial satellite is illustrated in FIG. 1, there are a plurality of artificial satellites and an appropriate artificial satellite is selected depending on the position and the like.

As a configuration for performing satellite communication, the marine vessel has an antenna unit 11, a satellite communication device 12, a GPS receiver 13, a PC 14, a telephone machine 15, a facsimile device 16, and the like.

The antenna unit 11 can transmit radio waves toward the artificial satellite 30 and can also receive radio waves from the artificial satellite 30. The antenna unit 11 is configured such that the elevation angle and the azimuth angle can be changed, and the antenna unit 11 can adjust its direction toward the artificial satellite 30.

The satellite communication device 12 conducts overall control with respect to the antenna unit 11 or communication. For example, the satellite communication device 12 has an interface for various purposes such as an NMEA, a LAN, an analog telephone, and the like, so as to transmit and receive data with respect to a connected instrument.

The GPS receiver 13 can detect the position of the marine vessel by receiving and analyzing a transmitted signal from a GPS satellite. The position of the marine vessel detected by the GPS receiver 13 is transmitted to the artificial satellite 30 through the antenna unit 11. As a result of this, the artificial satellite can know the position of the marine vessel, which makes it possible to use an appropriate artificial satellite or transmit highly directional radio waves from the artificial satellite.

The PC 14, the telephone machine 15, and the facsimile device 16 are connected with the satellite communication device 12, and achieve functions of the Internet (including a telephone call by VoIP), a telephone, and a facsimile, respectively. The satellite communication device 12 has an automatic answering function to an incoming call so as to automatically answer an incoming call. The automatic answering function can be turned ON or turned OFF.

In the same manner as the marine vessel, the land base point has an antenna unit 41 for transmitting and receiving radio waves with respect to the artificial satellite 30, a control device 42 for controlling it, a PC 43, a telephone machine 44, and the like.

Here, the antenna unit 41 and the control device 42 do not need to be arranged in the vicinity of the PC 43 or the telephone machine 44. For example, it can be configured such that data transmitted by the PC 43 is transmitted to another point through the Internet and this data is transmitted to the satellite through an antenna provided in this point.

With the above-described configuration, satellite communication can be achieved. Accordingly, a person who is in the land base point can talk with a person on the marine vessel using the telephone machine 44. A person who is in the land base point can also transmit and receive predetermined data with respect to the satellite communication device 12 or the PC 14 using the PC 43 or the like.

As described above, however, a metered rate is common with respect the communication amount of satellite communication. It is assumed that a person on the marine vessel conducts a connection process for conducting an operation using the Internet and conducts a disconnection process when finishing this operation. In such a case, according to a conventional configuration, a person in the land base point cannot transmit and receive predetermined data unless the person in the land base point makes a phone call to a person on the marine vessel and asks the person on the marine vessel to conduct a process of connecting to the Internet.

Figure 3:
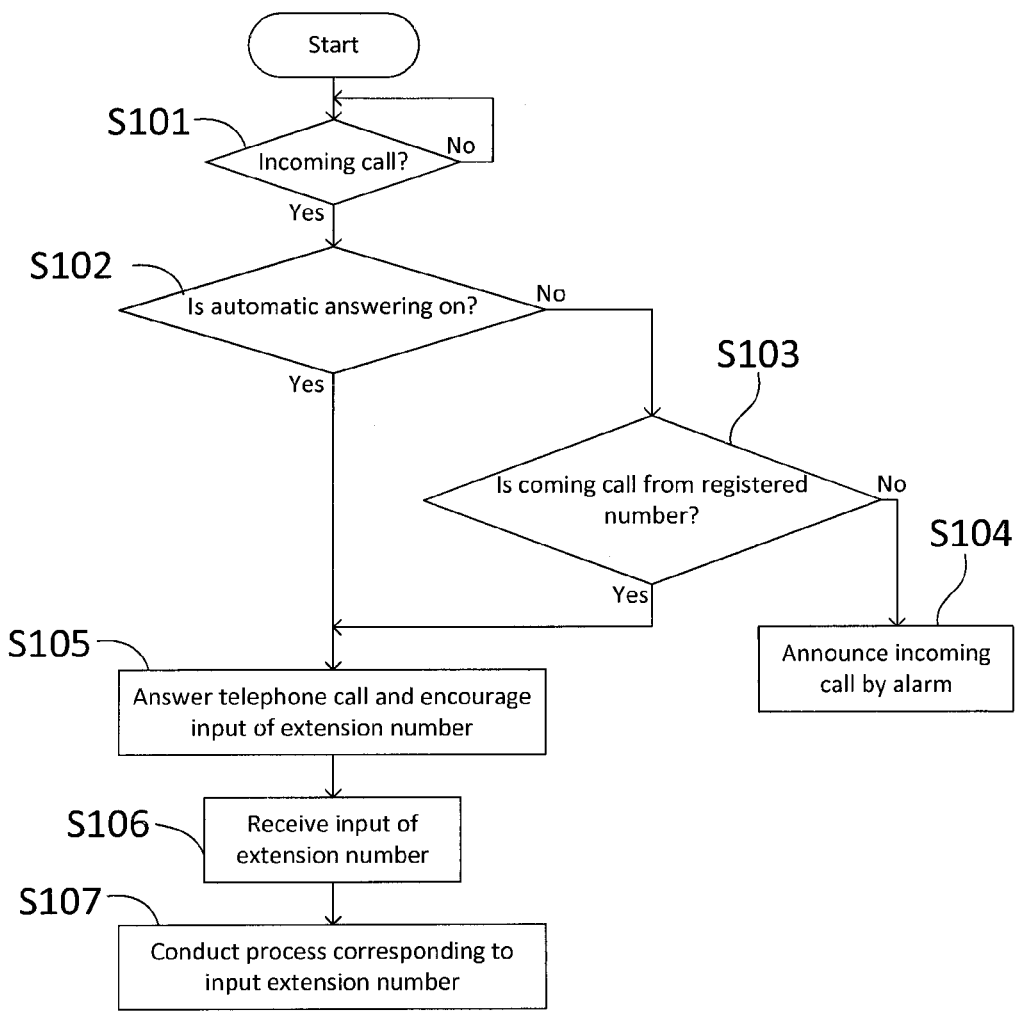
FIG. 3 is a flow chart explaining a process conducted by a control section.

In this respect, according to the configuration of the present invention, it is possible to cause the satellite communication device 12 to conduct a process of connecting to the Internet (a process of starting packet switching type communication) without asking a person on the marine vessel to conduct the process. FIG. 2 is a diagram explaining storage contents of a storing section 21. FIG. 3 is a flow chart explaining a process conducted by a control section 23.

In the present embodiment, the satellite communication device 12 receives instructions from a remote place by line switching type communication instead of packet switching type communication such as the Internet or the like. In the present embodiment, the satellite communication device 12 receives instructions based on an incoming call from an external telephone and an extension number input by the caller after the incoming call comes, and conducts a process corresponding to the instructions. Hereinafter, the configuration and the like of the satellite communication device 12 for achieving this function will be explained.

As a configuration to solve the above-described problem, the satellite communication device 12 has the storing section 21, an acquiring section 22, and the control section 23.

The storing section 21 stores extension numbers, and processes to be conducted by the control section 23 when the extension numbers are notified, by established correspondence (see FIG. 2). Here, regarding the correspondence relationship between the extension numbers and the processes, one extension number and one process can correspond to each other as shown in FIG. 2(*a*), or extension numbers can be set in a multi-tier manner (a two-tier manner in the drawing) as shown in FIG. 2(*b*). In the example shown in FIG. 2(*b*), the extension numbers are constructed of first extension numbers and second extension numbers. The first extension numbers are numbers to be input by a user first after answering a telephone call in the same manner as usual extension numbers. The second extension numbers are numbers to be input by encouraging a user to input. In a case of using multi-tier extension numbers, it can be configured such that a type of process is selected by the first extension number and a target of the process (transmission destination of data or the like) is selected by the second extension number, for example. As described above, instructions are issued based on the extension numbers in the present embodiment, and these extension numbers correspond to the "instruction information".

Here, each of the "processes to be conducted by the control section" listed in FIG. 2(*a*) will be briefly explained. "Start of remote connection" refers to a process of starting a remote connection to the PC 43 or the like in the land base point after connecting its machine to the Internet. By conducting this process, the PC 43 can access data stored in the satellite communication device 12, the PC 14, and the like. "Transmission of call/communication log" refers to a process of transmitting history (communication destination, communication time, communication contents) of the PC 14, the telephone machine 15, the facsimile device 16, or the like to the PC 43. "Transmission of operation status of instrument" refers to a process of transmitting operation status showing whether various kinds of instruments connected to the satellite communication device 12 normally operate or not, for example, or the history thereof to the PC 43 or the like. "Stop of predetermined communication" refers to a process of stopping (blocking) communication per terminal or application which uses the communication. For example, in a case where data of a large file size is frequently transmitted and received by an application in the PC 43, instructions to block the communication by the application are issued. "Restart" refers to a process of restarting the satellite communication device 12, the PC 14, or the like.

The "processes to be conducted by the control section" are not limited to the above, and for example, appropriate processes such as the history of a process conducted by the satellite communication device 12 can be registered. Also, a person on the marine vessel or in the land base point can edit (add, delete, change, etc.) the contents of the "processes to be conducted by the control section" using the PC 14, the PC 43, or the like. Here, a person in the land base point knows the latest storage contents of the storing section 21.

The acquiring section 22 acquires the telephone number and the extension number input by the caller through the antenna unit 11 or the like. The acquiring section 22 outputs the acquired telephone number and extension number to the control section 23.

The control section 23 conducts a process corresponding to the extension number acquired from the acquiring section 22 based on the information stored in the storing section 21. Hereinafter, the process conducted by the control section 23 will be explained with reference to the flow chart of FIG. 3.

The control section 23 determines whether or not there is an incoming call from the land base point or the like (S101). In a case where there is an incoming call, the control section 23 determines whether the automatic answering function is ON or OFF (S102).

In a case where the automatic answering function is ON, the call is automatically answered, and inputting an extension number is encouraged by an announcement or the like (S105). In this instance, the correspondence relationship between the extension number and the process can be announced based on the storage contents of the storing section 21, for example. A person in the land base point inputs a predetermined extension number based on these announcements.

Then, the satellite communication device 12 receives the input (S106). Also, the satellite communication device 12 can notify a person in the land base point that the input of the extension number (instructions to the control section 23) has been received. Alternatively, if the satellite communication device 12 can receive a plurality of instructions at the same time, the satellite communication device 12 can encourage inputting another extension number after receiving an extension number.

Next, the control section 23 reads out a process corresponding to the input extension number based on the storage contents of the storing section 21, and carries out the process (S107). Then, the control section 23 issues a notification that the process has been finished as needed. This notification can be conducted by telephone if the telephone is still connected, or can be conducted by another means such as e-mail or the like if the telephone number and the e-mail address are stored by established correspondence.

In S102, in a case where the automatic answering function is OFF, the satellite communication device 12 cannot answer the telephone call. In such a case, a person in the land base point usually cannot issue instructions to the control section 23. However, a telephone number used exclusively for issuing instructions to the control section 23, a telephone number which is always allowed to issue instructions to the control section 23, or the like is registered in the satellite communication device 12 in advance. In a case where there is an incoming call from the registered telephone number (S103), regardless whether the automatic answering is turned ON or OFF, the telephone call is answered, and inputting an extension number is encouraged (S105). Here, in a case where there is an incoming call from a telephone number other than the registered telephone numbers (S103), the call is announced by an alarm (S104).

As explained above, the satellite communication device 12 of the present embodiment has the acquiring section 22, the storing section 21, and the control section 23. The acquiring section 22 acquires instruction information through an artificial satellite by line switching type communication. The storing section 21 stores the instruction information and a registered process by established correspondence. The control section 23 reads out a process corresponding to the instruction information acquired by the acquiring section 22 based on storage contents of the storing section 21, and carries out the process that has been read out.

With this configuration, since the satellite communication device 12 automatically carries out a process (without any user intervention), it is possible to save the user's trouble. Also, even in a case where the satellite communication device 12 is not connected to the Internet, it is possible to cause the satellite communication device 12 to conduct a desired process from a remote place by performing line switching type communication. Also, since it is unlikely that delay will occur in the case of using line switching type communication, it is possible to reduce the possibility that instructions will be delayed.

A preferred embodiment is explained in the above. However, the above-described configuration can be modified as follows, for example.

The above-described embodiment has a configuration in which the settings of the automatic answering are changed depending on the telephone number of the caller. However, another example of control using the caller's telephone number can be given as follows. Specifically, in a case where there is an incoming call, only instructions from a telephone number that has been registered in advance are received, and in a case where there is an incoming call from another number, inputting an extension number is not encouraged. This control can improve the security.

Instead of this control, it can be configured such that only instructions from a telephone number that has been registered in advance are received for some highly important processes, and instructions from all telephone numbers are received for other processes.

The instruction information is not limited to the extension number. For example, it can be configured such that a telephone number is added using dial-in and a predetermined process is assigned to the telephone number by established correspondence. Also, SMS (short message service) can be used. More specifically, characters described in the title or text of a message and a process to be conducted corresponding thereto are stored in the storing section 21 by established correspondence. A person in the land base point inputs predetermined characters in the title or text of SMS and sends them to the satellite communication device 12. When receiving this message, the satellite communication device 12 conducts a process corresponding to the characters based on the storage contents of the storing section 21. In this case, the characters input in the title or text correspond to the "instruction information". Incidentally, since SMS normally uses the line switching method, delay hardly occurs compared to the Internet or the like. However, to some extent, there is a possibility that delay will occur. Also, in some cases, when the receiver cannot use the telephone lines, the message is temporarily stored and resent after a predetermined period of time passes. Therefore, it is difficult to determine in real time whether instructions have been transmitted to the satellite communication device 12 compared to a method using extension numbers.

The present invention has advantages in that the instructions will not be delayed and the arrival of the instructions can be confirmed in real time. Therefore, even in a case of being always-connected to the Internet, the present invention can be effectively utilized to issue emergency instructions or the like. Also, in a case of being connected to the Internet, instructions can be issued by VoIP with a flow similar to the above-described line switching type telephone. In the case of using VoIP, differently from the case of using e-mail, it is possible to confirm a response from the satellite communication device 12.

In the present invention, it is preferable that both of voice telephone and the Internet connection can be used by satellite communication. Therefore, regarding service to be used, Inmarsat (trademark) is preferable to Iridium (trademark).

In the above disclosure, the satellite communication device 12 has a configuration in which the storing section 21, the acquiring section 22, and the control section 23 are provided in one case. However, the constituent elements can be arranged physically separately from each other. For example, the storage contents of the storing section 21 can be stored in the PC 43 and referred as needed. In such a case, the combination of the satellite communication device 12 and the PC 43 corresponds to the "satellite communication device".

The configuration in which communication is performed between on the marine vessel and on the ground is explained in the above. However, it is sufficient for the communication to be performed through an artificial satellite. The present invention can be applied to various purposes such as communication between on marine vessels or between an isolated island and a land base point, for example.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A satellite communication device comprising:
   an acquirer configured to acquire instruction information through an artificial satellite by line switching type communication;
   a storage configured to store the instruction information, and at least one process of starting packet switching type communication with the artificial satellite; and
   a controller configured to automatically read out from the storage the at least one process that is designated by the instruction information acquired by the acquirer, and the controller being further configured to automatically carry out the process that has been read out to establish the packet switching type communication with the artificial satellite.

2. The satellite communication device according to claim 1, wherein
   the instruction information is acquired by telephone, and
   the acquirer is configured to automatically answer the telephone and acquire the instruction information.

3. The satellite communication device according to claim 2, wherein
   activating and deactivating automatic answering to a telephone call is switchable, and
   the acquirer is configured to automatically answer an incoming call in a case where the incoming call is from a registered number even if the automatic answering is deactivated.

4. The satellite communication device according to claim 1, wherein
   the process registered in the storage includes a process of transmitting log information which includes at least one of call history, communication history, process execution history, and operation status of an instrument.

5. The satellite communication device according to claim 1, wherein
   the storage is configured to store a plurality of pieces of the instruction information and a plurality of processes by established correspondence.

6. The satellite communication device according to claim 1, wherein
   a process conducted in response to the instruction information is editable.

7. The satellite communication device according to claim 1, wherein
   the controller is configured to give notice of at least one of a fact that an instruction has been received and a fact that a process based on the instruction has been finished to a sender of the instruction information.

8. The satellite communication device according to claim 1, wherein
   the satellite communication device is installed in a marine vessel.

9. The satellite communication device according to claim 2, wherein
   the process registered in the storage includes a process of transmitting log information which includes at least one of call history, communication history, process execution history, and operation status of an instrument.

10. The satellite communication device according to claim 9, wherein
    the storage is configured to store a plurality of pieces of the instruction information and a plurality of processes by established correspondence.

11. The satellite communication device according to claim 10, wherein
    a process conducted in response to the instruction information is editable.

12. The satellite communication device according to claim 11, wherein
    the controller is configured to give notice of at least one of a fact that an instruction has been received and a fact that a process based on the instruction has been finished to a sender of the instruction information.

13. The satellite communication device according to claim 12, wherein
    the satellite communication device is installed in a marine vessel.

14. The satellite communication device according to claim 1, wherein
    the storage is further configured to store a plurality of processes of starting packet switching type communication with the artificial satellite; and
    the controller is further configured to automatically read out from the storage one of the plurality of processes that is designated by the instruction information acquired by the acquirer and automatically carry out the process that has been read out to establish a respective type of the packet switching type communication with the artificial satellite according to the process.

15. A remote control method for a satellite communication device comprising:
    acquiring instruction information at the satellite communication device through an artificial satellite by line switching type communication; and
    automatically carrying out a process stored at the satellite communication device and designated by the instruction information acquired during the acquiring to cause the satellite communication device to automatically establish packet switching type communication with the artificial satellite.

16. The remote control method according to claim 15, wherein
    the automatically carrying out includes automatically reading out from a storage one of a plurality of processes that is designated by the instruction information acquired and automatically carrying out the process that has been read out to cause the satellite communication device to establish a respective kind of the packet switching type communication with the artificial satellite according to the process.

* * * * *